United States Patent
Luneau et al.

(10) Patent No.: US 9,458,416 B2
(45) Date of Patent: Oct. 4, 2016

(54) AMPHIPHILIC BLOCK COPOLYMERS AND MACHINE DISHWASHING DETERGENTS CONTAINING THESE

(71) Applicant: Henkel AG & Co. KGaA, Duesseldorf (DE)

(72) Inventors: Benoit Luneau, Ratingen (DE); Christian Kropf, Hilden (DE); Mareile Job, Leverkusen (DE); Nina Mussmann, Willich (DE); Thomas Eiting, Duesseldorf (DE); Konstantin Benda, Mettmann (DE); Thorsten Bastigkeit, Wuppertal (DE); Quang Ngoc Tran, Marseilles (FR); Trang Phan, Marseilles (FR); Didier Gigmes, Allauch (FR); Denis Bertin, Marseilles (FR)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/717,265

(22) Filed: May 20, 2015

(65) Prior Publication Data

US 2015/0275141 A1 Oct. 1, 2015

Related U.S. Application Data

(63) Continuation of application No. PCT/EP2013/068419, filed on Sep. 6, 2013.

(30) Foreign Application Priority Data

Nov. 23, 2012 (FR) ...................... 12 61195

(51) Int. Cl.
| | | |
|---|---|---|
| C08F 236/02 | (2006.01) |
| B08B 3/04 | (2006.01) |
| C11D 3/37 | (2006.01) |
| C08F 212/14 | (2006.01) |
| C08F 293/00 | (2006.01) |
| C11D 3/00 | (2006.01) |
| C08F 12/30 | (2006.01) |
| C08F 112/14 | (2006.01) |

(52) U.S. Cl.
CPC ............ *C11D 3/378* (2013.01); *C08F 212/14* (2013.01); *C08F 293/00* (2013.01); *C08F 293/005* (2013.01); *C11D 3/0021* (2013.01); *C08F 12/30* (2013.01); *C08F 112/14* (2013.01); *C08F 2438/02* (2013.01)

(58) Field of Classification Search
CPC ... C11D 3/3749; C11D 3/378; C08F 236/02; B08B 3/04
See application file for complete search history.

(56) References Cited

U.S. PATENT DOCUMENTS

| | | | |
|---|---|---|---|
| 2001/0044498 A1 | 11/2001 | Anthony et al. | |
| 2004/0072716 A1 | 4/2004 | Kistenmacher et al. | |
| 2005/0119146 A1* | 6/2005 | Rodrigues | C11D 1/008 510/224 |
| 2005/0129647 A1* | 6/2005 | Giroud | A61K 8/90 424/70.11 |

FOREIGN PATENT DOCUMENTS

| | | |
|---|---|---|
| DE | 102010039815 A1 | 3/2012 |
| EP | 0768370 A2 | 4/1997 |
| EP | 0916720 A1 | 5/1999 |
| WO | 03/095602 A1 | 11/2003 |
| WO | 2010/078979 A1 | 7/2010 |

OTHER PUBLICATIONS

PCT International Search Report (PCT/EP2013/068419) dated Jun. 11, 2013.

* cited by examiner

*Primary Examiner* — Brian P Mruk
(74) *Attorney, Agent, or Firm* — Thomas G. Krivulka

(57) ABSTRACT

It is possible to prevent or at least mitigate discoloration of plastics tableware during machine dishwashing by using amphiphilic block copolymers of $-A_n-B_m-$ type, where A represents the hydrophilic monomer unit of the hydrophilic block $A_n$ and B represents the hydrophobic monomer unit of the hydrophobic block $B_m$ and a diene serves as monomer for the hydrophobic monomer unit B.

7 Claims, No Drawings

AMPHIPHILIC BLOCK COPOLYMERS AND MACHINE DISHWASHING DETERGENTS CONTAINING THESE

FIELD OF THE INVENTION

The present invention generally relates to amphiphilic block copolymers, their use in detergents or cleaning agents, in particular in machine dishwashing detergents, and a method for machine dishwashing.

BACKGROUND OF THE INVENTION

When stains occur on plastic in the course of machine dishwashing, this is usually caused by very intensely colored foods such as curry, paprika, tomatoes, red cabbage, ketchup, carrots, etc., which in the form of food residues are introduced into the dishwasher. Stains on plastic, such as plastic dishware, result in consumer dissatisfaction, since, although the affected plastic dishware remains undamaged on a purely functional level, this is perceived by many consumers as detrimental to the appearance, insufficiently cleaned, or at least esthetically displeasing.

Compounds for reducing the staining of plastics are described in Patent Application WO 02/064720, for example. The cited publication discloses that copolymers based on hydrophobically modified polycarboxylates suppress the staining of plastics.

International Patent Application WO 03/095602 discloses a method for removing colored soils on plastic, using a component having a density of 0.6 to 1 g/L, in particular paraffin oil and similar hydrocarbons, olive oil, and soybean oil.

WO 2010/078979 discloses the use of porous polyamide particles and synthetic layered silicates for reducing the staining of plastic dishware.

According to German Patent Application DE 10104470, copolymers which contain at least two monoethylenically unsaturated monomers, one of which preferably represents an α-olefin having 10 or more carbon atoms, are used in machine dishwashing detergents for inhibiting the staining of plastic objects.

The object of the present invention is to provide further compounds which at least reduce the occurrence of stains on plastics, due to colored food residues, in the course of machine dishwashing.

It has surprisingly been found that this object is achieved by certain amphiphilic block copolymers which contain dienes as hydrophobic monomers.

Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Amphiphilic block copolymers of the $-A_n-B_m-$ type, wherein A represents the hydrophilic monomer unit of the hydrophilic block An, and B represents the hydrophobic monomer unit of the hydrophobic block $B_m$, characterized in that a diene is used as monomer for the hydrophobic monomer unit B.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The subject matter of the invention relates to amphiphilic block copolymers of the $-A_n-B_m-$ type, wherein A represents the hydrophilic monomer unit of the hydrophilic block $A_n$, and B represents the hydrophobic monomer unit of the hydrophobic block $B_m$, and a diene is used as monomer for the hydrophobic monomer unit B.

In one preferred embodiment, the amphiphilic block copolymers contain, as monomer for the hydrophobic block $B_m$, a diene or a plurality of dienes selected from the group of dienes containing 4 to 10 carbon atoms, in particular 4 to 8 carbon atoms, per monomer. Amphiphilic block copolymers which contain a diene or a plurality of dienes, selected from the group comprising 1,3-butadiene, 1,3-pentadiene, and isoprene, as monomer for the hydrophobic block $B_m$ are particularly advantageous.

Accordingly, preferred hydrophobic blocks $B_m$ have one or more of the following structures:

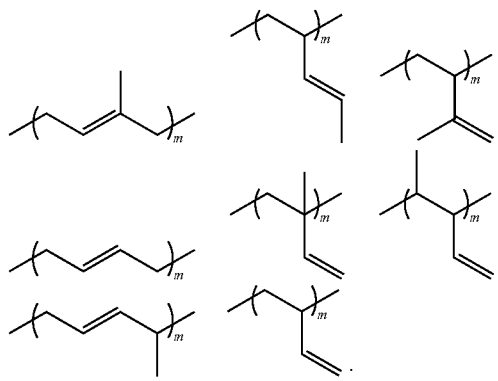

The hydrophilic monomer unit A has a proportion of the amphiphilic block copolymer of preferably 50 to 99 mol-%, in particular 70 to 90 mol-%, and may be formed from numerous hydrophilic monomers known from the prior art. However, it has proven particularly advantageous when the amphiphilic block copolymer contains styrene sulfonate, acrylic acid and derivatives thereof, for example methyacrylic acid, hydroxyethyl(meth)acrylic acid or salts thereof, (meth)acrylamide, and beta-carboxyethylacrylate such as Sipomer® B CEA, vinyl sulfonate, sulfoethyl methacrylate, sulfopropyl methacrylate, acrylamido-2-methylpropanesulfonic acid, 3-allyloxy-2-hydroxy-1-propanesulfonic acid, for example Sipomer® COPS1, or mixtures thereof, in particular styrene sulfonate, as hydrophilic monomer.

Preferred molecular weights of the amphiphilic block copolymer according to the invention are 1000 g/mol to 80,000 g/mol, preferably 2000 to 40,000 g/mol.

The subject matter of the invention further relates to the use of the amphiphilic block copolymers according to the invention in detergents or cleaning agents, in particular in machine dishwashing detergents. The amphiphilic block copolymers according to the invention are preferably used in machine dishwashing detergents for reducing stains on dishware made of synthetic material, in particular plastic. In general, reduction in staining is understood to mean that the transfer of colored substances, resulting from colored food residues, to plastic dishware when it is cleaned in an automatic dishwasher is at least reduced, and in the best case is even completely eliminated. However, the term is also understood to mean that a change in the perceived color of plastic dishware when it is cleaned in an automatic dishwasher is at least reduced, and in the best case is completely eliminated. In one preferred embodiment of the invention, the amphiphilic block copolymers are used in quantities of 0.1 to 25% by weight in the detergents or cleaning agents. In particular for use in machine dishwashing detergents, quantities of 0.1 to 10% by weight, preferably 1 to 8% by weight, very particularly preferably 2 to 6% by weight, are advantageous.

The subject matter of the invention further relates to a machine dishwashing detergent which contains the amphiphilic block copolymers according to the invention, in particular in quantities of 0.1 to 10% by weight, preferably 1 to 8% by weight, very particularly preferably 2 to 6% by weight.

The subject matter of the present invention further relates to a method for machine dishwashing for reducing the staining of plastic dishware, in which an amphiphilic block copolymer according to the invention or a machine dishwashing detergent according to the invention is used.

The change in the perceived color of plastic dishware when it is cleaned in an automatic dishwasher may be avoided or at least reduced. The transfer of colored substances, resulting from colored food residues, to plastic dishware when it is cleaned in an automatic dishwasher may be eliminated or at least reduced. The transfer of the following colored substances may be inhibited or at least reduced in a particularly effective manner:

orange-red carotenoids such as lycopene or beta-carotene, for example from tomatoes, ketchup, or carrots,
yellow curcuma pigments such as curcumin, for example from curry and mustard.

The transfer of the following colored substances may also be inhibited as necessary:

red to blue anthocyan pigments such as cyanidin, for example from cherries or blueberries,
red betanidin, for example from red beets,
brown tannins, for example from tea, fruit, red wine,
dark brown humic acid, for example from coffee, tea, cocoa,
green chlorophyll, for example from green herbs.

In particular white and brightly colored plastic materials benefit from the invention. In one preferred embodiment, the plastic materials are made of polyethylene or polypropylene.

In addition, further known color transfer inhibitors may be used if desired, preferably in quantities of 0.01% by weight to 5% by weight, in particular 0.1% by weight to 1% by weight. In one preferred embodiment of the invention, these include a polymer of vinyl pyrrolidone, vinyl imidazole, or vinyl pyridine N-oxide, or a copolymer of these compounds is usable. Polyvinyl pyrrolidones having molar weights of 15,000 to 50,000 as well as polyvinyl pyrrolidones having molar weights greater than 1,000,000, in particular 1,500,000 to 4,000,000, N-vinyl imidazole/N-vinyl pyrrolidone copolymers, polyvinyl oxazolidones, polyamine N-oxide polymers, polyvinyl alcohols, and copolymers based on acrylamidoalkenyl sulfonic acids are usable.

For use in agents according to the invention, polyvinyl pyrrolidones preferably have an average molar mass in the range of 10,000 to 60,000, in particular in the range of 25,000 to 50,000. Of the copolymers, those composed of vinyl pyrrolidone and vinyl imidazole in a molar ratio of 5:1 to 1:1 and an average molar mass in the range of 5,000 to 50,000, in particular 10,000 to 20,000, are preferred.

Porous polyamide particles and/or synthetic layered silicates and/or glycerol esters and/or thiosulfate and/or hydrophobically modified polysaccharides and/or anionic surfactants such as alkylbenzene sulfonate and/or alkane sulfonates may be used as further known color transfer inhibitors.

The machine dishwasher detergents according to the invention may be solid or liquid, and in particular may be present as powdered solids, in compacted particle form, or as homogeneous solutions or suspensions. In another preferred embodiment of the invention, the machine dishwasher detergent is present in a pre-portioned form. In another preferred embodiment of the invention, the machine dishwasher detergent includes multiple compositions which are spatially separate from one another, thus allowing incompatible ingredients to be separate, or compositions to be provided in combination which are utilized at different times in the dishwasher. This is particularly advantageous when the machine dishwasher detergents are present in pre-portioned form. At least one of the compositions is present in solid form and/or at least one of the compositions is present in liquid form, wherein the hydrophobically modified polysaccharides are contained in at least one of the compositions, but may also be present multiple compositions.

The machine dishwasher detergents preferably contain at least one further component, in particular at least two further components, selected from the group composed of builders, additional surfactants, polymers, bleaching agents, bleach activators, and bleach catalysts, in particular based on manganese or cobalt, enzymes, corrosion inhibitors and glass corrosion inhibitors, disintegration aids, fragrances, and fragrance carriers.

Builders may advantageously be used. The builders include in particular zeolites, silicates, carbonates, organic co-builders, and, where there are no environmental restrictions on use, also phosphates.

Crystalline layered silicates of the general formula $NaMSi_xO_{2x+1} \cdot y\ H_2O$ may preferably be used, where M represents sodium or hydrogen, x stands for a number from 1.9 to 22, preferably from 1.9 to 4, particularly preferred values for x being 2, 3, or 4, and y stands for a number from 0 to 33, preferably from 0 to 20. The crystalline layered silicates of formula $NaMSi_xO_{2x+1} \cdot y\ H_2O$ are marketed, for example, by Clariant GmbH (Germany) under the trade name Na-SKS. Examples of these silicates are Na-SKS-1 ($Na_2Si_{22}O_{45} \cdot x\ H_2O$, kenyaite), Na-SKS-2 ($Na_2Si_{14}O_{29} \cdot x\ H_2O$, magadiite), Na-SKS-3 ($Na_2Si_8O_{17} \cdot x\ H_2O$), or Na-SKS-4 ($Na_2Si_4O_9 \cdot x\ H_2O$, makatite). Crystalline layered silicates of formula $NaMSi_xO_{2x+1} \cdot y\ H_2O$, in which x stands for 2, are particularly suitable for the purposes of the present invention. Particularly preferred are β- and δ-sodium disilicates $Na_2Si_2O_5 \cdot y\ H_2O$, primarily Na-SKS-5 ($\alpha\text{-}Na_2Si_2O_5$), Na-SKS-7 ($\beta\text{-}Na_2Si_2O_5$, natrosilite), Na-SKS-9 ($NaHSi_2O_5 \cdot H_2O$), Na-SKS-10 ($NaHSi_2O_5 \cdot 3H_2O$, kanemite), Na-SKS-11 ($t\text{-}Na_2Si_2O_{55}$), and Na-SKS-13 ($NaHSi_2O_5$), in particular Na-SKS-6 ($\delta\text{-}Na_2Si_2O_5$).

Machine dishwasher detergents preferably contain a weight fraction of the crystalline layered silicate of formula $NaMSi_xO_{2x+1} \cdot y\ H_2O$ of 0.1 to 20% by weight, preferably 0.2 to 15% by weight, in particular 0.4 to 10% by weight, in each case based on the total weight of these agents.

Also usable are amorphous sodium silicates having an $Na_2O:SiO_2$ module of 1:2 to 1:3.3, preferably 1:2 to 1:2.8, in particular 1:2 to 1:2.6, and which preferably are delayed-dissolving and have secondary washing properties. The delay in dissolution compared to conventional amorphous sodium silicates may have been brought about in various ways, for example by surface treatment, compounding, compaction/compression, or overdrying. Within the scope of the present invention, the term "amorphous" is understood to mean that the silicates produce no sharp X-ray reflections in X-ray diffraction experiments, as are typical for crystalline substances, but, rather, at best produce one or multiple maxima of the scattered X-ray radiation which have a width of several degree units of the diffraction angle.

Within the scope of the present invention, it is preferred that this/these silicate(s), preferably alkali silicates, particularly preferably crystalline or amorphous alkali disilicates, is/are contained in the agents in quantities of 3 to 60% by weight, preferably 8 to 50% by weight, in particular 20 to 40% by weight, in each case based on the weight of the machine dishwasher detergent.

Of course, use of the generally known phosphates as builder substances is also possible, provided that such use is not to be avoided for environmental reasons. Of the numerous commercially available phosphates, the alkali metal phosphates, particularly preferably pentasodium or pentapotassium triphosphate (sodium or potassium tripolyphosphate), have the greatest importance in the detergent or cleaning agent industry.

"Alkali metal phosphates" is the collective term for the alkali metal (in particular sodium and potassium) salts of the various phosphoric acids, of which a distinction may be made between metaphosphoric acids ($HPO_3$) and orthophosphoric acid ($H_3PO_4$), in addition to higher-molecular representatives. The phosphates combine several advantages: they act as alkali carriers, prevent lime deposits on machine parts or lime incrustations in fabrics, and also contribute to the cleaning performance.

Phosphates of particular commercial importance are pentasodium triphosphate, $Na_5P_3O_{10}$ (sodium tripolyphosphate), and the corresponding potassium salt pentapotassium triphosphate, $K_5P_3O_{10}$ (potassium tripolyphosphate). The sodium potassium tripolyphosphates are preferably usable according to the invention.

When phosphates are used within the scope of the present patent application as detergent or cleaning active substances in machine dishwasher detergent, these phosphates are particularly preferably pentasodium or pentapotassium triphosphate (sodium or potassium tripolyphosphate) in quantities of 5 to 80% by weight; preferably 15 to 75% by weight, in particular 20 to 70% by weight, in each case based on the weight of the machine dishwasher detergent.

The alkali carriers are further builders. Examples of suitable alkali carriers are alkali metal hydroxides, alkali metal carbonates, alkali metal hydrogen carbonates, alkali metal sesquicarbonates, the mentioned alkali silicates, alkali metal silicates, and mixtures of the above-mentioned substances; within the meaning of the present invention, preferably the alkali carbonates, in particular sodium carbonate, sodium hydrogen carbonate, or sodium sesquicarbonate may be used. A builder system containing a mixture of tripolyphosphate and sodium carbonate is particularly preferred. A builder system containing a mixture of tripolyphosphate and sodium carbonate and sodium disilicate is likewise particularly preferred. Due to their low chemical compatibility with the other ingredients of machine dishwasher detergents, compared to other builder substances, the optional alkali metal hydroxides are preferably used only in small quantities, preferably in quantities less than 10% by weight, preferably less than 6% by weight, particularly preferably less than 4% by weight, in particular less than 2% by weight, in each case based on the total weight of the machine dishwasher detergent. Agents containing less than 0.5% by weight based on their total weight, and in particular containing no alkali metal hydroxide, are particularly preferred.

The use of carbonate(s) and/or hydrogen carbonate(s), preferably alkali carbonate(s), particularly preferably sodium carbonate, in quantities of 2 to 50% by weight, preferably 5 to 40% by weight, in particular 7.5 to 30% by weight, in each case based on the weight of the machine dishwasher detergent, is particularly preferred. Agents containing less than 20% by weight, preferably less than 17% by weight, preferably less than 13% by weight, in particular less than 9% by weight, carbonate(s) and/or hydrogen carbonate(s) (based on the weight of the machine dishwasher detergent), preferably alkali carbonate(s), particularly preferably sodium carbonate, are particularly preferred.

In particular polycarboxylates/polycarboxylic acids, polymeric polycarboxylates, asparaginic acid, polyacetals, dextrins, further organic co-builders, and phosphonates are mentioned as organic co-builders. These substance classes are described below.

Examples of usable organic builder substances are the polycarboxylic acids which are usable in the form of the free acid and/or their sodium salts, wherein polycarboxylic acids are understood to mean those carboxylic acids bearing more than one acid function. Examples include citric acid, adipic acid, succinic acid, glutaric acid, malic acid, tartaric acid, maleic acid, fumaric acid, sugar acids, nitrilotriacetic acid (NTA), provided such use is not objectionable for environmental reasons, and mixtures thereof. The free acids, in addition to their builder effect, typically also have the property of an acidification component, and are thus also used for setting a lower, milder pH value of the machine dishwasher detergent. In particular citric acid, succinic acid, glutaric acid, adipic acid, gluconic acid, and any given mixtures thereof are mentioned in this regard.

For the cleaning and clear rinse performance of agents according to the invention, the use of citric acid and/or citrates in these agents has proven to be particularly advantageous. Therefore, according to the invention, machine dishwasher detergents are preferred in which the machine dishwasher detergent contains citric acid or a salt of citric acid, and the weight fraction of the citric acid or of the salt of citric acid is preferably greater than 10% by weight, preferably greater than 15% by weight, in particular between 20 and 40% by weight.

Aminocarboxylic acids and/or their salts represent another important class of phosphate-free builders. Particularly preferred representatives of this class are methylglycinediacetic acid (MGDA) or its salts, glutamine diacetic acid (GLDA) or its salts, or ethylenediamine diacetic acid (EDDA) or its salts. The content of these aminocarboxylic acids or their salts may be, for example, between 0.1 and 15% by weight, preferably between 0.5 and 10% by weight, in particular between 0.5 and 6% by weight. Aminocarboxylic acids and their salts may be used together with the above-mentioned builders, in particular also with the phosphate-free builders.

Also suited as builders are polymeric polycarboxylates such as the alkali metal salts of polyacrylic acid or of polymethacrylic acid, for example those having a relative molecular mass of 500 to 70,000 g/mol.

Suitable polymers are in particular polyacrylates which preferably have a molecular mass of 2000 to 20,000 g/mol. Due to their excellent solubility, of this group the short-chain polyacrylates having molar masses of 2000 to 10,000 g/mol, particularly preferably 3000 to 5000 g/mol, may be preferred.

Also suitable are copolymeric polycarboxylates, in particular those of acrylic acid with methacrylic acid, and of acrylic acid or methacrylic acid with maleic acid. Copolymers of acrylic acid with maleic acid, containing 50 to 90% by weight acrylic acid and 50 to 10% by weight maleic acid, have proven to be particularly suitable. Their relative molecular mass, based on free acids, is generally 2000 to 70,000 g/mol, preferably 20,000 to 50,000 g/mol, in particular 30,000 to 40,000 g/mol.

The (co-)polymeric polycarboxylates may be used either as a powder or as an aqueous solution. The content of (co-)polymeric polycarboxylates in the machine dishwasher detergents is preferably 0.5 to 20% by weight, in particular 3 to 10% by weight.

For improving the solubility in water, the polymers may also contain allyl sulfonic acids, such as allyloxybenzenesulfonic acid and methallyl sulfonic acid, as monomer.

Copolymers having acrolein and acrylic acid/acrylic acid salts, or acrolein and vinyl acetate, as monomers are also preferred.

In addition, all compounds which are able to form complexes with alkaline earth ions may be used as builders.

In one preferred embodiment, although no cellulose derivatives modified with sulfonic acid groups are used for inhibiting stains on plastics, sulfonic acid group-containing polymers may be used as a water softener in machine dishwasher detergents. Sulfonic acid group-containing polymers are known to those skilled in the art from the literature. Copolymers of unsaturated carboxylic acids, sulfonic acid group-containing monomers, and optionally further ionogenic or nonionogenic monomers are particularly preferably usable as sulfonic acid group-containing polymers.

Preferred copolymeric sulfopolymers contain, in addition to sulfonic acid group-containing monomer(s), at least one monomer from the group of unsaturated carboxylic acids.

Particularly preferably used as unsaturated carboxylic acid(s) are unsaturated carboxylic acids of the formula $R^1(R^2)C=C(R^3)COOH$, in which $R^1$ to $R^3$ independently stand for —H, —CH$_3$, a straight-chain or branched saturated alkyl radical containing 2 to 12 carbon atoms, a straight-chain or branched, mono- or polyunsaturated alkenyl radical containing 2 to 12 carbon atoms, alkyl or alkenyl radicals as defined above which are substituted with —NH$_2$, —OH, or —COOH, or stand for —COOH or —COOR$^4$, where $R^4$ is a saturated or unsaturated, straight-chain or branched hydrocarbon radical containing 1 to 12 carbon atoms.

Particularly preferred unsaturated carboxylic acids are acrylic acid, methacrylic acid, ethacrylic acid, α-chloroacrylic acid, α-cyanoacrylic acid, crotonic acid, α-phenylacrylic acid, maleic acid, maleic acid anhydride, fumaric acid, itaconic acid, citraconic acid, methylenemalonic acid, sorbic acid, cinnamic acid, or mixtures thereof.

Sulfonic acid group-containing monomers of the formula

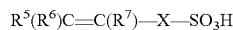

are preferred in which $R^5$ to $R^7$ independently stand for —H, —CH$_3$, a straight-chain or branched saturated alkyl radical containing 2 to 12 carbon atoms, a straight-chain or branched, mono- or polyunsaturated alkenyl radical containing 2 to 12 carbon atoms, alkyl or alkenyl radicals as defined above which are substituted with —NH$_2$, —OH, or —COOH, or stand for —COOH or —COOR$^4$, where $R^4$ is a saturated or unsaturated, straight-chain or branched hydrocarbon radical containing 1 to 12 carbon atoms, and X stands for an optionally present spacer group selected from —(CH$_2$)$_n$—, where n=0 to 4, —COO—(CH$_2$)$_k$—, where k=1 to 6, —C(O)—NH—C(CH$_3$)$_2$—, —C(O)—NH—C(CH$_3$)$_2$—CH$_2$—, and —C(O)—NH—CH(CH3)-CH$_2$—.

Of these monomers, those of formulas

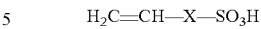

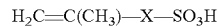

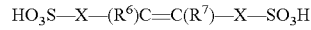

are preferred, in which $R^6$ and $R^7$ are independently selected from —H, —CH$_3$, —CH$_2$CH$_3$, —CH$_2$CH$_2$CH$_3$, and —CH(CH$_3$)$_2$, and X stands for an optionally present spacer group selected from —(CH$_2$)$_n$,— where n=0 to 4, —COO—(CH$_2$)$_k$—, where k=1 to 6, —C(O)—NH—C(CH$_3$)$_2$—, —C(O)—NH—C(CH$_3$)$_2$—CH$_2$—, and —C(O)—NH—CH(CH$_3$)—CH$_2$—.

Particularly preferred sulfonic acid group-containing monomers are 1-acrylamido-1-propanesulfonic acid, 2-acrylamido-2-propanesulfonic acid, 2-acrylamido-2-methyl-1-propanesulfonic acid, 2-methacrylamido-2-methyl-1-propanesulfonic acid, 3-methacrylamido-2-hydroxypropanesulfonic acid, allyl sulfonic acid, methallyl sulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrenesulfonic acid, vinylsulfonic acid, 3-sulfopropylacrylate, 3-sulfopropylmethacrylate, sulfomethacrylamide, sulfomethylmethacrylamide, and mixtures of the mentioned acids or their water-soluble salts.

The sulfonic acid groups may be present in the polymers partially or completely in neutralized form; i.e., the acidic hydrogen atom of the sulfonic acid group may be substituted with metal ions, preferably alkali metal ions, in particular sodium ions, in some or all sulfonic acid groups. The use of partially or completely neutralized sulfonic acid group-containing copolymers is preferred according to the invention.

For copolymers which contain only carboxylic acid group-containing monomers and sulfonic acid group-containing monomers, the monomer distribution of the copolymers preferably used according to the invention is in each case preferably 5 to 95% by weight; the proportion of the sulfonic acid group-containing monomer is particularly preferably 50 to 90% by weight, and the proportion of the carboxylic acid group-containing monomer is particularly preferably 10 to 50% by weight, the monomers preferably being selected from those mentioned above.

The molar mass of the sulfo copolymers preferably used according to the invention may be varied in order to adapt the properties of the polymers to the intended purpose. Preferred machine dishwasher detergents are characterized in that the copolymers have molar masses of 2000 to 200,000 gmol$^{-1}$, preferably 4000 to 25,000 gmol$^{-1}$, in particular 5000 to 15,000 gmol$^{-1}$.

In another preferred embodiment, the copolymers include, in addition to carboxyl group-containing monomer and sulfonic acid group-containing monomer, at least one nonionic, preferably hydrophobic, monomer. It has been possible to improve in particular the clear rinse performance of machine dishwasher detergents according to the invention by using these hydrophobically modified polymers.

In another preferred embodiment of the invention, the agents contain at least one anionic copolymer containing
 i) carboxylic acid group-containing monomer(s)
 ii) sulfonic acid group-containing monomer(s)
 iii) nonionic monomer(s).

As nonionic monomers, monomers of the general formula R¹(R²)C=C(R³)—X—R⁴ are preferably used in which R¹ to R³ independently stand for —H, —CH₃, or —C₂H₅, X stands for an optionally present spacer group selected from —CH₂—, —C(O)O—, and —C(O)—NH—, and R⁴ stands for a straight-chain or branched, saturated alkyl radical containing 2 to 22 carbon atoms or for an unsaturated, preferably aromatic, radical containing 6 to 22 carbon atoms.

Particularly preferred nonionic monomers are butene, isobutene, pentene, 3-methylbutene, 2-methylbutene, cyclopentene, hexene, 1-hexene, 2-methyl-1-pentene, 3-methyl-1-pentene, cyclohexene, methylcyclopentene, cycloheptene, methylcyclohexene, 2,4,4-trimethyl-1-pentene, 2,4,4-trimethyl-2-pentene, 2,3-dimethyl-1-hexene, 2,4-dimethyl-1-hexene, 2,5-dimethyl-1-hexene, 3,5-dimethyl-1-hexene, 4,4-dimethyl-1-hexane, ethylcyclohexyne, 1-octene, α-olefins containing 10 or more carbon atoms, such as 1-decene, 1-dodecene, 1-hexadecene, 1-octadecene, and $C_{22}$ α-olefin, 2-styrene, α-methylstyrene, 3-methylstyrene, 4-propylstyrene, 4-cyclohexylstyrene, 4-dodecylstyrene, 2-ethyl-4-benzylstyrene, 1-vinylnaphthalene, 2-vinylnaphthalene, acrylic acid methyl ester, acrylic acid ethyl ester, acrylic acid propyl ester, acrylic acid butyl ester, acrylic acid pentyl ester, acrylic acid hexyl ester, methacrylic acid methyl ester, N-(methyl)acrylamide, acrylic acid 2-ethylhexyl ester, methacrylic acid 2-ethylhexyl ester, N-(2-ethylhexyl)acrylamide, acrylic acid octyl ester, methacrylic acid octyl ester, N-(octyl)acrylamide, acrylic acid lauryl ester, methacrylic acid lauryl ester, N-(lauryl)acrylamide, acrylic acid stearyl ester, methacrylic acid stearyl ester, N-(stearyl)acrylamide, acrylic acid behenyl ester, methacrylic acid behenyl ester, and N-(behenyl)acrylamide, or mixtures thereof.

The agents according to the invention may contain surfactants; the group of surfactants includes nonionic, anionic, cationic, and amphoteric surfactants.

All nonionic surfactants known to those skilled in the art may be used as nonionic surfactants. Examples of suitable nonionic surfactants are alkylglycosides of general formula $RO(G)_x$, in which R corresponds to a primary aliphatic radical which is straight-chain or methyl-branched, in particular methyl-branched in the 2-position, containing 8 to 22, preferably 12 to 18, C atoms, and G is the symbol for a glycose unit containing 5 or 6 C atoms, and preferably stands for glucose. The degree of oligomerization x, which indicates the distribution of monoglycosides and oligoglycosides, is any given number between 1 and 10; x is preferably between 1.2 and 1.4.

Another class of preferably usable nonionic surfactants, which may be used either as nonionic surfactant alone or in combination with other nonionic surfactants, is alkoxylated, preferably ethoxylated or ethoxylated and propoxylated, fatty acid alkyl esters, preferably containing 1 to 4 carbon atoms in the alkyl chain.

Nonionic surfactants of the aminoxide type, such as N-coco alkyl-N,N-dimethylaminoxide and N-tallow alkyl-N,N-dihydroxyethylaminoxide, and the fatty acid alkanolamides may also be suitable. The content of these nonionic surfactants is preferably not greater than, in particular not greater than one-half of, the ethoxylated fatty alcohols.

Other suitable surfactants are the polyhydroxy fatty acid (PHFA) amides.

Low-foaming nonionic surfactants may be used as preferred surfactants. The machine dishwasher detergents particularly preferably contain nonionic surfactants from the group of alkoxylated alcohols. Alkoxylated, advantageously ethoxylated, primary alcohols in particular, preferably containing 8 to 18 C atoms and an average of 1 to 12 moles ethylene oxide (EO) per mole alcohol, are preferably used as nonionic surfactants, in which the alcohol radical may be linear or preferably methyl-branched in the 2-position, or in which linear and methyl-branched radicals may be contained in the mixture, as are typically present in oxoalcohol radicals. In particular, however, alcohol ethoxylates containing linear radicals from alcohols of natural origin containing 12 to 18 C atoms, for example from coconut alcohol, palm alcohol, tallow fat alcohol, or oleyl alcohol, and having an average of 2 to 8 moles EO per mole alcohol are preferred. The preferred ethoxylated alcohols include, for example, $C_{12-14}$ alcohols having 3 EO or 4 EO, $C_{9-11}$ alcohols having 7 EO, $C_{13-15}$ alcohols having 3 EO, 5 EO, 7 EO, or 8 EO, $C_{12-18}$ alcohols having 3 EO, 5 EO, or 7 EO, and mixtures thereof, such as mixtures of $C_{12-14}$ alcohol having 3 EO and $C_{12-18}$ alcohol having 5 EO. The stated degrees of ethoxylation represent statistical mean values, which for a particular product may correspond to a whole number or a fractional number. Preferred alcohol ethoxylates have a narrow homolog distribution (narrow range ethoxylates (NRE)). In addition to these nonionic surfactants, fatty alcohols having greater than 12 EO may also be used. Examples of such are tallow fat alcohol having 14 EO, 25 EO, 30 EO, or 40 EO.

In particular, nonionic surfactants having a melting point above room temperature are preferred. Nonionic surfactant(s) having a melting point above 20° C., preferably above 25° C., particularly preferably between 25 and 60° C. and in particular between 26.6 and 43.3° C., is/are particularly preferred.

Preferably used surfactants come from the groups of alkoxylated nonionic surfactants, in particular ethoxylated primary alcohols and mixtures of these surfactants with surfactants having a complicated structure, such as polyoxypropylene/polyoxyethylene/polyoxypropylene ((PO/EO/PO) surfactants). Such (PO/EO/PO) nonionic surfactants are also characterized by good foam control.

Within the scope of the present invention, low-foaming nonionic surfactants having alternating ethylene oxide and alkylene oxide units have proven to be particularly preferred nonionic surfactants. Of these, surfactants having EO-AO-EO-AO blocks are preferred, in which in each case one to ten EO or AO groups, respectively, are bound to one another before a block made up of the respective other group follows. Nonionic surfactants of the general formula

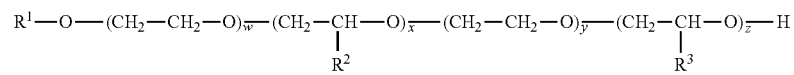

are preferred here, in which R¹ stands for a straight-chain or branched, saturated or mono- or polyunsaturated $C_{6-24}$ alkyl or alkenyl radical; each group R² or R³ is independently selected from —CH₃, —CH₂CH₃, —CH₂CH₂—CH₃, CH(CH₃)₂, and the indices w, x, y, z independently stand for integers from 1 to 6.

Thus, in particular nonionic surfactants are preferred which contain a $C_{9-15}$ alkyl radical having 1 to 4 ethylene oxide units, followed by 1 to 4 propylene oxide units, followed by 1 to 4 ethylene oxide units, followed by 1 to 4 propylene oxide units. In aqueous solution these surfactants have the required, low viscosity, and are particularly preferably usable according to the invention.

Surfactants of the general formula

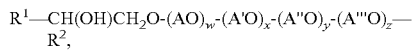

in which $R^1$ and $R^2$ independently stand for a straight-chain or branched, saturated or mono- or polyunsaturated $C_{2-40}$ alkyl or alkenyl radical; A, A', A", and A'" independently stand for a radical from the group —$CH_2CH_2$—, —$CH_2CH_2$—$CH_2$, —$CH_2$—$CH(CH_3)$, —$CH_2$—$CH_2$—$CH_2$—$CH_2$, —$CH_2$—$CH(CH_3)$—$CH_2$—, —$CH_2$—$CH(CH_2$—$CH_3)$; and w, x, y, and z stand for values between 0.5 and 90, where x, y, and/or z may also be 0, are particularly preferred according to the invention.

In one preferred embodiment, very particularly preferred nonionic surfactants have the general formula $R^1O[CH_2CH(CH_3)O]_x[CH_2CH_2O]_y[CH_2CH(CH_3)O]_zCH_2CH(OH)R^2$, in which $R^1$ stands for a linear or branched aliphatic hydrocarbon radical containing 4 to 22 carbon atoms or mixtures thereof, $R^2$ stands for a linear or branched hydrocarbon radical containing 2 to 26 carbon atoms, in particular 4 to 20 carbon atoms, or mixtures thereof, and x and z stand for values between 0 and 40 and y stands for a value of at least 15.

The stated C chain lengths and the degrees of ethoxylation or degrees of alkoxylation of the above-mentioned nonionic surfactants represent statistical mean values, which for a particular product may correspond to a whole number or a fractional number. Due to the manufacturing processes, commercial products having the mentioned formulas are usually composed not of an individual representative, but, rather, from mixtures, so that mean values, and consequently fractional numbers, may result for the C chain lengths and for the degrees of ethoxylation or degrees of alkoxylation.

Likewise, other anionic sulfonate surfactants may be used in addition to the anionic sulfonate surfactants already mentioned above. These include in particular the (fatty) alkyl sulfates and (fatty) alkyl ether sulfates, but also all other anionic surfactants known to those skilled in the art. The total content of the anionic surfactants in the agents according to the invention is preferably 10% by weight maximum.

Cationic and/or amphoteric surfactants may be used instead of the mentioned surfactants or in combination with same. For example, cationic compounds of the following formulas may be used as cationic active substances:

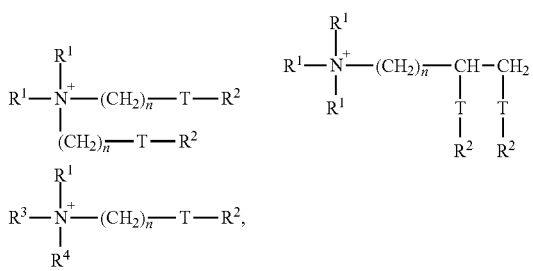

where each group $R^1$ is independently selected from $C_{1-6}$ alkyl, alkenyl, or hydroxyalkyl groups; each group $R^2$ is independently selected from $C_{8-28}$ alkyl or alkenyl groups; $R^3$=$R^1$ or $(CH_2)_n$-T-$R^2$; $R^4$=$R^1$ or $R^2$ or $(CH_2)_n$-T-$R^2$; T=—$CH_2$—, —O—CO—, or —CO—O— and n is an integer from 0 to 5.

In machine dishwasher detergents, the content of cationic and/or amphoteric surfactants is preferably less than 6% by weight, preferably less than 4% by weight, very particularly preferably less than 2% by weight, in particular less than 1% by weight. Machine dishwasher detergents which contain no cationic or amphoteric surfactants are particularly preferred.

The group of polymers includes in particular polymers having washing or cleaning activity, such as clear rinse polymers and/or polymers having water softening activity. In general, cationic, anionic, and amphoteric polymers are usable in addition to nonionic polymers in machine dishwasher detergents.

Within the meaning of the present invention, cationic polymers are polymers bearing a positive charge in the polymer molecule. This may be achieved, for example, by (alkyl) ammonium groups or other positively charged groups present in the polymer chain. Particularly preferred cationic polymers come from the groups of quaternized cellulose derivatives, polysiloxanes containing quaternary groups, cationic guar derivatives, polymeric dimethyldiallylammonium salts and their copolymers with esters and amides of acrylic acid and methacrylic acid, copolymers of vinyl pyrrolidone with quaternized derivatives of dialkylaminoacrylate and dialkylaminomethacrylate, vinyl pyrrolidone-methoimidazolinium chloride copolymers, quaternized polyvinyl alcohols, or the polymers designated by the INCI names polyquaternium-2, polyquaternium-17, polyquaternium-18, and polyquaternium-27.

Within the meaning of the present invention, amphoteric polymers have, in addition to a positively charged group in the polymer chain, negatively charged groups or monomer units. These groups may be carboxylic acids, sulfonic acids, or phosphonic acids, for example.

Preferred amphoteric polymers which may be used come from the group of alkylacrylamide/acrylic acid copolymers, alkylacrylamide/methacrylic acid copolymers, alkylacrylamide/methylmethacrylic acid copolymers, alkylacrylamide/acrylic acid/alkylaminoalkyl(meth)acrylic acid copolymers, alkylacrylamide/methacrylic acid/alkylaminoalkyl (meth)acrylic acid copolymers, alkylacrylamide/ methylmethacrylic/ acid/alkylaminoalkyl(meth)acrylic acid copolymers, alkylacrylamide/alkylmethacrylate/alkylaminoethylmethacrylate/alkylmethacrylate copolymers, and copolymers of unsaturated carboxylic acids, cationically derivatized unsaturated carboxylic acids, and optionally further ionic or nonionogenic monomers.

Preferred zwitterionic polymers which may be used come from the group of acrylamidoalkyltrialkylammonium chloride/acrylic acid copolymers and their alkali and ammonium salts, acrylamidoalkyltrialkylammonium chloride/methacrylic acid copolymers and their alkali and ammonium salts, and methacroylethylbetaine/methacrylate copolymers.

In one particularly preferred embodiment of the present invention, the polymers are present in preprepared form. The following methods, among others, are suitable for the preparation:

Encapsulating the polymers using water-soluble or water-dispersible coating agents, preferably water-soluble or water-dispersible natural or synthetic polymers;

Encapsulating the polymers using water-insoluble, meltable coating agents, preferably water-insoluble coating agents from the group of waxes or paraffins having a melting point above 30° C.;

Co-granulating the polymers with inert carrier materials, preferably carrier materials from the group of substances having washing or cleaning activity, particularly preferably from the group of builders or co-builders.

Machine dishwasher detergents preferably contain the above-mentioned cationic and/or amphoteric polymers in quantities between 0.01 and 10% by weight, in each case based on the total weight of the machine dishwasher detergent. However, within the scope of the present patent application, machine dishwasher detergents are preferred in which the weight fraction of the cationic and/or amphoteric polymers is between 0.01 and 8% by weight, preferably between 0.01 and 6% by weight, preferably between 0.01 and 4% by weight, particularly preferably between 0.01 and 2% by weight, in particular between 0.01 and 1% by weight, in each case based on the total weight of the machine dishwasher detergent.

The bleaching agents which may particularly preferably be used are substances having washing or cleaning activity. Of the compounds which are used as bleaching agent and supply $H_2O_2$ in water, sodium percarbonate, sodium perborate tetrahydrate, and sodium perborate monohydrate are of particular importance. Examples of other bleaching agents that may be used are peroxypyrophosphates, citrate perhydrates, peracid salts or peracids which supply $H_2O_2$, such as perbenzoates, peroxophthalates, diperazelaic acid, phthaloiminoperacid, or diperdodecanoic diacid. All other inorganic or organic peroxy bleaching agents known to those skilled in the art are also usable.

Substances that release chlorine or bromine may also be used as bleaching agents. Examples of suitable materials that release chlorine or bromine include heterocyclic N-bromamides and N-chloramides, for example trichloroisocyanuric acid, tribromoisocyanuric acid, dibromoisocyanuric acid, and/or dichloroisocyanuric acid (DICA) and/or their salts with cations such as potassium and sodium. Hydantoin compounds such as 1,3-dichloro-5,5-dimethylhydantoin are likewise suitable.

According to the invention, machine dishwasher detergents are preferred which contain 1 to 35% by weight, preferably 2.5 to 30% by weight, particularly preferably 3.5 to 20% by weight, in particular 5 to 15% by weight, bleaching agent, preferably sodium percarbonate.

Compounds which under perhydrolysis conditions result in aliphatic peroxocarboxylic acids preferably containing 1 to 10 C atoms, in particular 2 to 4 C atoms, and/or optionally substituted perbenzoic acid, may be used as bleach activators. Of the bleach activators known to those skilled in the art, polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenol sulfonates, in particular n-nonanoyl- or isononanoyloxybenzenesulfonate (n- or iso-NOBS, respectively), are particularly preferably used. Combinations of conventional bleach activators may also be used. These bleach activators are preferably used in quantities up to 10% by weight, in particular 0.1% by weight to 8% by weight, in particular 2 to 8% by weight, particularly preferably 2 to 6% by weight, in each case based on the total weight of the agent containing bleach activator.

Enzymes may also be used to increase the washing or cleaning performance of machine dishwasher detergents. These include in particular proteases, amylases, lipases, hemicellulases, cellulases, perhydrolases, or oxidoreductases, and preferably mixtures thereof. In principle, these enzymes are of natural origin; starting from the natural molecules, improved variants are available for use in machine dishwasher detergents, and may therefore preferably be used. Machine dishwasher detergents preferably contain enzymes in overall quantities of $1\times10^{-6}$ to 5% by weight, based on active protein. The protein concentration may be determined using known methods such as the BCA method or the biuret method. However, enzymatic systems, including a peroxidase and hydrogen peroxide or a substance which supplies hydrogen peroxide in water, may also be used. The addition of a mediator compound for the peroxidases, such as acetosyringone, a phenol derivative, or phenothiazine or phenoxazine, is preferred in this case; in addition, the above-mentioned conventional polymeric active ingredients which inhibit color transfer may also be used.

The enzymes may be used in any form that is established according to the prior art. Examples include solid preparations obtained by granulation, extrusion, or lyophilization or, in particular for agents in the form of a liquid or gel, solutions of the enzymes, advantageously preferably concentrated, low in water, and/or combined with stabilizers.

Alternatively, the enzymes may be encapsulated for the solid as well as the liquid dosage form, for example by spray drying or extrusion of the enzyme solution together with a preferably natural polymer, or in the form of capsules, such as those in which the enzymes are incorporated into a solidified gel, or those of the core-shell type in which an enzyme-containing core is coated with a protective layer that is impermeable to water, air, and/or chemicals. Multiple enzymes and/or enzyme preparations, preferably protease preparations and amylase preparations, may preferably be used in quantities of 0.1 to 5% by weight, preferably 0.2 to 4.5% by weight, in particular 0.4 to 4% by weight, in each case based on the total enzyme-containing agent.

Glass corrosion inhibitors prevent the occurrence of cloudiness, streaks, and scratches, as well as iridescence of the surface of glasses which are machine-washed. Preferred glass corrosion inhibitors come from the group of magnesium salts and zinc salts as well as magnesium complexes and zinc complexes. Within the scope of the present invention, the content of zinc salt in machine dishwasher detergents is preferably 0.1 to 5% by weight, preferably 0.2 to 4% by weight, in particular 0.4 to 3% by weight, or the content of zinc in oxidized form (calculated as $Zn^{2+}$) is 0.01 to 1% by weight, preferably 0.02 to 0.5% by weight, in particular 0.04 to 0.2% by weight, in each case based on the total weight of the agent containing the glass corrosion inhibitor.

To facilitate the disintegration of preprepared molded bodies, it is possible to incorporate disintegration aids, so-called tablet disintegrants, into these agents in order to shorten the disintegration time. Tablet disintegrants or disintegration accelerators are understood to mean auxiliary substances which provide for rapid disintegration of tablets in water or other media, and for quick release of the active ingredients. Disintegration aids may preferably be used in quantities of 0.5 to 10% by weight, preferably 3 to 7% by weight, in particular 4 to 6% by weight, in each case based on the total weight of the agent containing the disintegration aid.

Within the scope of the present invention, individual fragrance compounds, such as the synthetic products of esters, ethers, aldehydes, ketones, alcohols, and hydrocarbons, may be used as perfume oils or fragrances. However, mixtures of various fragrances which together create a pleasing aroma are preferred. Such perfume oils may also contain natural fragrance mixtures, such as those available from plant sources, for example pine oil, citrus oil, jasmine oil, patchouli oil, rose oil, or ylang-ylang oil.

Machine dishwasher detergents may be prepared in various ways. The agents may be present in solid or liquid form, or as a combination of solid and liquid forms. In particular powders, granules, extrudates, compactates, in particular tablets, are suitable as solid forms. The liquid forms based on water and/or organic solvents may be present thickened in the form of gels. The agents may be prepared in the form of single-phase or multi-phase products. Particularly preferred are machine dishwasher detergents having one, two, three, or four phases. Machine dishwasher detergents present in the form of a prepared dosage unit having two or more phases are particularly preferred. The individual phases of multi-phase agents may have the same or different physical states. In particular, machine dishwasher detergents are preferred which have at least two different solid phases and/or at least two liquid phases and/or at least one solid phase and at least one liquid phase.

Machine dishwasher detergents are preferably prepared as dosage units. These dosage units preferably include the quantity of substances with washing or cleaning activity which are necessary for one cleaning operation. Preferred dosage units have a weight between 12 and 30 g, preferably between 14 and 26 g, in particular between 16 and 22 g. To achieve an optimal cleaning and clear rinse result, machine dishwasher detergents are preferred which are present in the form of a preprepared dosage unit and which contain between 0.001 and 1 g, preferably between 0.01 and 0.1 g, particularly preferably between 0.01 and 0.07 g, in particular between 0.01 and 0.05 g, of polymer a), or which contain between 0.1 and 2.5 g, preferably between 0.2 and 2.2 g, particularly preferably between 0.3 and 1.9 g, in particular between 0.4 and 1.5 g, of nonionic surfactant(s) b). The volume of the above-mentioned dosage units and their shape are particularly preferably selected in such a way that dosability of the preprepared units via the dosing chamber of a dishwasher is ensured. The volume of the dosage unit is therefore preferably between 10 and 35 mL, preferably between 12 and 30 mL.

Machine dishwasher detergents, in particular the preprepared dosage units of machine dishwasher detergents, particularly preferably have a water-soluble wrapping.

The subject matter of the present patent application further relates to a method for reducing the staining of plastic dishware in a dishwasher, wherein an amphiphilic block copolymer according to the invention, or a machine dishwashing detergent according to the invention which contains an amphiphilic block copolymer, is dosed into the interior of a' dishwasher during the course of a dishwashing operation, prior to or during the main wash cycle. The agent according to the invention may be manually dosed or introduced into the interior of the dishwasher; however, the agent is preferably dosed into the interior of the dishwasher via the dosing chamber.

A typical basic formulation for a machine dishwasher detergent which preferably may be used, for example in tablet form, includes the following substances:

| | |
|---|---|
| Sodium tripolyphosphate | 20-50% by weight |
| Sodium carbonate | 10-30% by weight |
| Sodium percarbonate | 5-18% by weight |
| Bleach activator | 0.5-5% by weight |
| Bleach catalyst | 0.01-1% by weight |
| Sulfopolymer | 2.5-15% by weight |
| Polycarboxylate | 0.1-10% by weight |

-continued

| | |
|---|---|
| Nonionic surfactant | 0.5-10% by weight |
| Phosphonate | 0.5-5% by weight |
| Protease | 0.1-5% by weight |
| Amylase | 0.1-5% by weight, |

Instead of the Na-tripolyphosphate, in particular 10-50% by weight citrate, MGDA, GLDA, or EDDA, or mixtures of two or three of these substances may be used in the formulation.

EXAMPLES

Example 1

Preparation of Polystyrene Sulfonate Having a Molecular Weight of 20,000 g/mol 60 g of the sodium salt of p-styrene sulfonate was combined with 1.03 g BlocBuilder MA® (Arkema), 0.04 g free SG1 nitroxide (Arkema), and 200 mL dimethylsulfoxide (DMSO) in a Parr metal reactor provided with a magnetic stirrer; the mixture was degassed under argon for 15 minutes and subsequently kept under a protective argon atmosphere. The polymerization was carried out for 3 hours at 110° C.

Example 2

Preparation of Polystyrene Sulfonate Having a Molecular Weight of 2000 g/mol 60 g of the sodium salt of p-styrene sulfonate was combined with 10.3 g BlocBuilder MA® (Arkema), 0.04 g free SG1 nitroxide (Arkema), and 200 mL dimethylsulfoxide (DMSO) in a Parr metal reactor provided with a magnetic stirrer; the mixture was degassed under argon for 15 minutes and subsequently kept under a protective argon atmosphere. The polymerization was carried out for 2 hours at 110° C.

Example 3

Preparation of Amphiphilic Copolymer A 60 g of the polystyrene sulfonate prepared according to Example 1 was combined with 12 mL 1,4-isoprene and 200 mL DMSO in a Parr metal reactor provided with a magnetic stirrer; the mixture was degassed under argon for 15 minutes and subsequently kept under a protective argon atmosphere. The copolymerization was carried out for 72 hours at 120° C. The copolymer was precipitated in acetone, dissolved in water, and once again precipitated in acetone, subsequently filtered, and washed several times with acetone.

The $^1$H-NMR analysis showed a monomer content of 77 mol-% styrene sulfonate and 23 mol-% isoprene for the amphiphilic copolymer A.

Example 4

Preparation of Amphiphilic Copolymer B 60 g of the polystyrene sulfonate prepared according to Example 1 was combined with 7 mL 1,4-isoprene and 200 mL DMSO in a Parr metal reactor provided with a magnetic stirrer; the mixture was degassed under argon for 15 minutes and subsequently kept under a protective argon atmosphere. The copolymerization was carried out for 72 hours at 120° C. The copolymer was precipitated in acetone, dissolved in water, and once again precipitated in acetone, subsequently filtered, and washed several times with acetone.

The $^1$H-NMR analysis showed a monomer content of 86 mol-% styrene sulfonate and 14 mol-% isoprene for the amphiphilic copolymer B.

Example 5

Preparation of Amphiphilic Copolymer C 60 g of the polystyrene sulfonate prepared according to Example 2 was combined with 12 mL 1,4-isoprene and 200 mL DMSO in a Parr metal reactor provided with a magnetic stirrer; the mixture was degassed under argon for 15 minutes and subsequently kept under a protective argon atmosphere. The copolymerization was carried out for 72 hours at 120° C. The copolymer was precipitated in acetone, dissolved in water, and once again precipitated in acetone, subsequently filtered, and washed several times with acetone.

The $^1$H-NMR analysis showed a monomer content of 76 mol-% styrene sulfonate and 24 mol-% isoprene for the amphiphilic copolymer C.

Example 6

Preparation of Amphiphilic Copolymer D 60 g of the polystyrene sulfonate prepared according to Example 2 was combined with 7 mL 1,4-isoprene and 200 mL DMSO in a Parr metal reactor provided with a magnetic stirrer; the mixture was degassed under argon for 15 minutes and subsequently kept under a protective argon atmosphere. The copolymerization was carried out for 72 hours at 120° C. The copolymer was precipitated in acetone, dissolved in water, and once again precipitated in acetone, subsequently filtered, and washed several times with acetone.

The $^1$H-NMR analysis showed a monomer content of 88 mol-% styrene sulfonate and 12 mol-% isoprene for the amphiphilic copolymer D.

Example 7

Inhibition of the Discoloration of Plastic During Automatic Dishwashing (Test Setup)

0.73 g of a soiling mixture (see Table 1 for composition) together with 10 g Lupolen® HDPE (polyethylene beads, BASF) were mixed in 25 mL water having a hardness of 21° dH. 0.12 g (corresponding to 20 g in 4 liters) of a powdered machine dishwasher detergent (see Table 2 for composition) as well as 6.25 mg of the respective additive to be investigated were added thereto. The mixture was stirred rapidly for 10 minutes at room temperature and then filtered. and 5 mL was withdrawn from the filtrate, combined with 5 mL toluene, agitated for 1 minute, and subsequently centrifuged until phase separation occurred. 1 mL of the toluene phase was analyzed by UV-VIS spectroscopy, and the amount of the colored substance was quantified. The absorption of the main peak at 484 nm was used for comparison. The extinction of the pure soiling mixture in water, of the soiling mixture together with the polymer beads, and of the soiling mixture together with the polymer beads and the machine dishwasher detergent were also measured for comparison.

Larger quantities of colored substance in the solution mean that less colored substance has been deposited on the plastic (in the present case, the polyethylene beads).

The values given below are the mean values from a triple determination.

TABLE 1

| Composition of the soiling mixture in % by weight | |
|---|---|
| Olive oil | 12.8 |
| Essence of vinegar | 4.2 |
| Tomato ketchup | 68.0 |
| Paprika | 3.2 |
| Curry | 3.2 |
| Table salt | 8.6 |

TABLE 2

| Composition of the machine dishwasher detergent in % by weight | |
|---|---|
| Phosphate | 40.0 |
| Sodium carbonate | 12.5 |
| Phosphonate | 2.5 |
| Sulfonic acid group-containing polymer | 8.0 |
| Polyacrylate | 8.5 |
| Nonionic surfactants | 6.5 |
| Percarbonate | 15.5 |
| TAED | 2.5 |
| Bleach catalyst | 1.0 |
| Amylases | 0.8 |
| Proteases | 2.4 |
| Zinc acetate | 0.2 |
| Remainder | To make 100 |

TABLE 3

| Extinction values at 484 nm, in 25 mL water | |
|---|---|
| 0.73 g soiling material | 0.72 |
| 0.73 g + 10 g Lupolen ® HDPE | 0.1 |
| 0.73 g + 10 g Lupolen ® HDPE + 0.12 g dishwasher detergent | 0.2 |
| 0.73 g + 10 g Lupolen ® HDPE + 0.12 g dishwasher detergent + 6.25 mg HPMC | 0.38 |
| 0.73 g + 10 g Lupolen ® HDPE + 0.12 g dishwasher detergent + 6.25 mg HPMC | 0.35 |
| 0.73 g + 10 g Lupolen ® HDPE + 0.12 g dishwasher detergent + 6.25 mg HPMC | 0.37 |
| 0.73 g + 10 g Lupolen ® HDPE + 0.12 g dishwasher detergent + 6.25 mg HEMC | 0.37 |

It is clear from the table that use of the block copolymers according to the invention results in a marked improvement in the inhibition of staining.

Example 8

Inhibition of the Discoloration of Plastic During Automatic Dishwashing (Practical Test)

Polyethylene breakfast trays (PE board) were subjected to a machine dishwashing operation (dishwasher: AEG Proclean; Quick Program (55° C., 50 minutes, water hardness 21° dH)). 117.4 g of the soiling material composition given in Table 1 was used as ballast soiling. For cleaning the breakfast trays, 20 g of the powdered machine dishwasher detergent given in Table 2 and in each case 1 g of the additive to be investigated were dosed. The values L, a, and b were measured before and after the washing, using a colorimeter (Datacolor DC 600-3). The ΔE value was subsequently determined from these values. The lower the determined ΔE value, the less the soiling of the boards. The results are presented in Table 4. The greater the difference between the ΔE values, the more apparent the color difference (see Table 5).

TABLE 4

ΔE values and ΔE value difference from the base value

|  | ΔE | ΔE difference |
|---|---|---|
| PE board + dishwasher detergent (base value) | 8.33 |  |
| PE board + dishwasher detergent + block copolymer A | 6.47 | 1.83 |
| PE board + dishwasher detergent + block copolymer B | 6.60 | 1.73 |

It is apparent from Table 4 that noticeable color differences were determined using amphiphilic block copolymer A and also using amphiphilic block copolymer B.

TABLE 5

Assessment of the ΔE value difference

| ΔE difference | Assessment |
|---|---|
| 0.0-0.5 | Little to no difference |
| 0.5-1.0 | Difference visible to the trained eye |
| 1.0-2.0 | Perceivable color difference |
| 2.0-4.0 | Noticeable color difference |
| 4.0-5.0 | Significant color difference |
| Greater than 5.0 | Difference assessed as another color |

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A detergent or cleaning agent for machine dishwashing comprising:
    a.) from 0.1 to 10% by weight amphiphilic block copolymers -$A_n$-$B_m$-, wherein A represents the hydrophilic monomer unit of the hydrophilic block $A_n$, and B represents the hydrophobic monomer unit of the hydrophobic block $B_m$, wherein a diene is used as monomer for the hydrophobic monomer unit B
    b) from 0.01 to 5% by weight of color transfer inhibitor selected from the group consisting of polymers or copolymers of vinyl pyrrolidone, vinyl imidazole and vinyl pyridine N-oxide.

2. The detergent or cleaning agent according claim 1, wherein B comprises a diene or a plurality of dienes selected from the group consisting of 1,3-butadiene, 1,3-pentadiene, and isoprene.

3. The detergent or cleaning agent according to claim 1, wherein the hydrophobic block $B_m$ has one or more of the structures selected from the following:

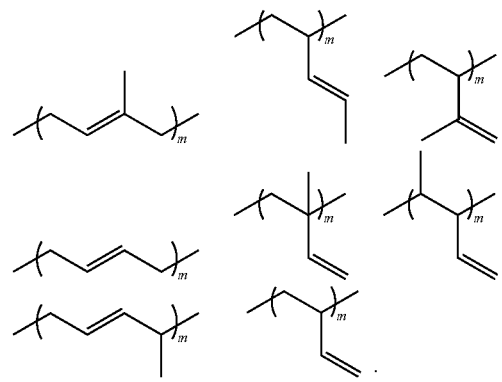

4. The detergent or cleaning agent according to claim 1, wherein the content of hydrophilic monomer of the block copolymer is 50 to 99 mol-%.

5. The detergent or cleaning agent according to claim 1, wherein the hydrophilic monomer unit of the block copolymer is selected from the group consisting of styrene sulfonate, acrylic acid and derivatives thereof, hydroxyethyl (meth)acrylic acid or salts thereof, (meth)acrylamide, beta-carboxyethylacrylate, vinyl sulfonate, sulfoethyl methacrylate, sulfopropyl methacrylate, acrylamido-2-methylpropanesulfonic acid, 3-allyloxy-2-hydroxy-1-propanesulfonic acid, or mixtures thereof.

6. The detergent or cleaning agent according to claim 1 wherein the block copolymers have a molar weight of 1000 to 80,000 g/mol.

7. A method for machine dishwashing, wherein the detergent or cleaning agent according to claim 1 is dosed into the interior of a dishwasher during the course of the dishwashing operation, prior to the main wash cycle or during the main wash cycle.

* * * * *